United States Patent [19]
Doyle, Jr.

[11] 3,779,736
[45] Dec. 18, 1973

[54] 1,3,4-THIADIAZINE HERBICIDES

[75] Inventor: William C. Doyle, Jr., Leawood, Kans.

[73] Assignee: Gulf Research & Development Company, Pittsburgh, Pa.

[22] Filed: Jan. 4, 1971

[21] Appl. No.: 103,814

[52] U.S. Cl. ............................... 71/90, 260/243 R
[51] Int. Cl. ............................................. A01n 9/12
[58] Field of Search ......................... 71/90; 260/243

[56] References Cited
UNITED STATES PATENTS
2,838,389   6/1958   Yoder ..................................... 71/90

*Primary Examiner*—James O. Thomas, Jr.
*Attorney*—Richard L. Kelly, Carl A. Cline, Forrest D. Stine and Howard F. Van Denburgh

[57] ABSTRACT

New N-substituted derivatives of 2-amino-5-tert.butyl-6H-1,3,4-thiadiazine are employed to combat undesired vegetation by both post- and pre-emergent application techniques, carbamyl substituted compounds are preferred.

4 Claims, No Drawings

1,3,4-THIADIAZINE HERBICIDES

DESCRIPTION OF THE INVENTION

I have discovered a new class of herbicidal compounds which exhibit variable and interesting activity and selectivity when applied both post-and pre-emergently. Individual members of the group may be applied in the presence of growing crops such as corn or soybeans to combat undesired vegetation, both broad-leafed species and grasses. According to the present invention one may combat undesired vegetation by applying to the undesired vegetation a herbicidally effective amount of 1,3,4-thiadiazine compound having the structural formula

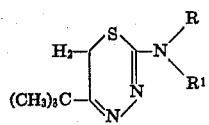

in which R is hydrogen, methyl or ethyl and $R^1$ is selected from the group consisting of lower N-alkyl or N-alkenyl carbamyl, lower N-alkenyl or N-alkylthiocarbamyl, $C_2$ to $C_5$ acyl and lower alkoxycarbonyl substituents. The novel compounds may be prepared from available starting materials according to procedures of the type specifically exemplified below.

PROCEDURES FOR SYNTHESIS OF HERBICIDES

PREPARATION OF 2-AMINO-5-TERT.BUTYL-6H-1,3,4-THIADIAZINE

A mixture of 25.4 g thiosemicarbazide hydrochloride and 35.6 g of 1-bromo-3,3-dimethyl-2-butanone in 100 ml of absolute ethanol is heated 15 to 20 hours on the steam bath. The resultant slurry is filtered and the solid is washed with ethanol, dissolved in water and neutralized with sodium carbonate, giving 14.5 g of 2-amino-5-tert. butyl-6H-1,3,4-thiadiazine, m.p. 72°-4°.

Using the same procedure, the reaction of 4-methylthiosemicarbazide hydrochloride and 4-ethylthiosemicarbazide hydrochloride gives 2-methylamino-5-tert.butyl-6H-1,3,4-thiadiazine and 2-ethylamino-5-tert.butyl-6H-1,3,4-thiadiazine respectively.

PREPARATION OF N-METHYL-N'-(5-TERT.BUTYL-6H-1,3,4-THIADIAZIN-2-YL)UREA

To a solution of 8.0 g 2-amino-5-tert.butyl-6H-1,3,4-thiadiazine in 25 ml dioxane is added rapidly 2.7 g methyl isocyanate, causing a slight rise in temperature and the gradual precipitation of a crystalline solid. This solid is collected by filtration and is washed with hexane, giving N-methyl-N'-(5-tert.butyl-6H-1,3,4-thiadiazin-2-yl)urea, m.p. 191°–3°. In a similar manner the reaction of methyl isocyanate with the appropriate 2-alkylaminothiadiazine gives N,N'-dimethyl-N'-(5-tert.butyl-6H-1,3,4-thiadiazin-2-yl)urea and N-methyl-N'-ethyl-N'-(5-tert.butyl-6H-1,3,4-thiadiazin-2-yl)urea.

PREPARATION OF N,N'-DIMETHYL-N'-(5-TERT.BUTYL-6H-1,3,4-THIADIAZIN-2-YL)THIOUREA

A solution of 21.5 g of 2-methylamino--tert.butyl-6H-1,3,4-thiadiazine and 6.7 g methyl isothiocyanate in 50 ml dioxane is heated to reflux for several hours and the solution is evaporated to dryness on a rotary evaporator. The residue is dissolved in benzene and the benzene solution is extracted with water, dried and evaporated, giving N,N'-dimethyl-N'-(5-tert. butyl-6H-1,3,4-thiadiazin-2-yl)thiourea as a viscous gum.

PREPARATION OF 2-CHLOROACETAMIDO-5-TERT.BUTYL-6H-1,3,4-THIADIAZINE

To a solution of 3.7 g of 2-amino-5-tert.butyl-6H-1,3,4-thiadiazine and 2.2 g triethylamine in 25 ml dioxane is added dropwise 2.5 g of chloroacetyl chloride. The solution is stirred several hours, poured into water and the resultant precipitate filtered, washed with water and air dried to give 2-chloroacetamido-5-tert.butyl-6H-1,3,4-thiadiazine, m.p. 158°–9°.

Using procedures similar to those described above, the remaining compounds listed in Table I were prepared.

TABLE I

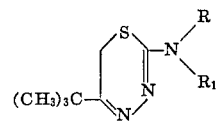

| | | | Analysis | | | | | |
| | | | Calc'd | | | Found | | |
| R | R₁ | M.P. (° C.) | C | H | N | C | H | N |
| --- | --- | --- | --- | --- | --- | --- | --- | --- |
| H | H | 72–4 | 49.09 | 7.65 | 24.54 | | | |
| CH₃ | H | 83–4 | 51.58 | 8.12 | 22.56 | 51.74 | 8.11 | 22.78 |
| C₂H₅ | H | 115–20 | 54.23 | 8.60 | 21.08 | 54.24 | 8.62 | 21.45 |
| H | —CONHCH₃ | 191–3 | 47.40 | 7.02 | 24.55 | 47.83 | 7.38 | 23.23 |
| CH₃ | —CONHCH₃ | 79–81 | 49.56 | 7.49 | 23.12 | 46.58 | 7.93 | 21.14 |
| C₂H₅ | —CONHCH₃ | 108–110 | 51.53 | 7.86 | 21.86 | | | |
| H | —COCH₂Cl | 158–9 | 43.70 | 5.66 | 16.99 | 43.48 | 5.88 | 16.67 |
| CH₃ | —COOCH₃ | Oil | 49.36 | 7.04 | 17.27 | 50.23 | 7.16 | 15.00 |
| CH₃ | —COOCH₂CH₂Cl | 56–60 | 45.28 | 6.22 | 14.40 | 45.44 | 6.40 | 14.08 |
| CH₃ | —CSNHCH₃ | Gum | 46.48 | 7.02 | 21.63 | 47.02 | 7.48 | 18.24 |
| CH₃ | —COOC₄H₉ | 71–4 | 55.09 | 7.47 | 14.83 | 54.96 | 8.04 | 15.28 |
| CH₃ | —COOC₂H₅ | 89–90 | 54.74 | 7.93 | 17.41 | 54.96 | 8.06 | 16.89 |
| CH₃ | —CONHAllyl | 119–20 | 53.70 | 7.51 | 20.88 | 53.54 | 7.34 | 20.66 |

COMBATING UNWANTED VEGETATION

The novel herbicides are effective when used both post- and pre-emergently. There is described below an illustrative procedure for herbicidal use of the compounds under controlled conditions in the greenhouse so as to obtain data on phytotoxic activity and selectivity.

1. Post-Emergent Use

An aqueous dispersion of each active compound was prepared by combining 0.4 gram of the compound with about 4 ml of a solvent-emulsifier mixture (3 parts of a commercial polyoxy-ethylated vegetable oil emulsifier, one part xylene, one part kerosene) and then adding water, with stirring, to a final volume of 40 ml.

The species of plants on which each compound was to be tested were planted in 4 inch pots in a greenhouse. 10 to 18 days after emergence of the plants, three pots of each species were sprayed with an aqueous dispersion of the active compound prepared as described above, at a rate of 5 lb of active compound per acre and at a spray volume of 60 gallons per acre. Approximately one week after the spray application the plants were observed and the results rated according to the following schedule.

DEGREE OF EFFECT
0 = no effect
1 = slight effect
2 = moderate effect
3 = severe effect
4 = maximum effect (all plants died)

The same rating schedule was employed to judge pre-emergent results obtained according to the procedure below.

2. Pre-Emergent Use

A solution of each active compound was prepared by dissolving 290 mg of the compound to be tested in 200 ml of acetone. Disposable expanded polystyrene trays about 2½ inches deep and about one square foot in area were prepared and sprayed with the acetone solution at the rate of 10 lb of active chemical per acre of sprayed area and were then covered with about ¼ inch of soil. 21 days after seeding and treatment the plants were examined and herbicidal effect was rated according to the above schedule.

Both post-emergent and pre-emergent results are set forth in the following table.

TABLE II

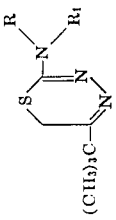

| R | R₁ | Type | Crabgrass | Coxcomb | Brome | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|---|
| H | —CONHCH₃ | Post | | | | 0 | | | 3 | 4 | | | 2 | 4 | | | 4 |
| CH₃ | —CONHCH₃ | Pre | 4 | 4 | 4 | 4 | 4 | 4 | 4 | 4 | 3 | 4 | 4 | 4 | | | |
| CH₃ | —CONHCH₃ | Post | | | | 4 | | | 4 | 4 | | | 4 | 4 | | | |
| C₂H₅ | —CONHCH₃ | Pre | 4 | 4 | 4 | 4 | 4 | 4 | 4 | 4 | 4 | 4 | 4 | 4 | | 3 | |
| CH₃ | —COOCH₃ | Post | 3 | | 4 | 1 | 4 | 3 | 3 | 2 | 1 | | 4 | 4 | | | |
| CH₃ | —COOCH₂CH₂Cl | Pre | 4 | 3 | 4 | 4 | 4 | | 4 | 4 | 1 | 4 | 4 | 4 | | | 3 |
| CH₃ | —CSNHCH₃ | Post | 1 | 1 | | 1 | | | | 1 | 1 | | 3 | 3 | | 1 | 4 |
| CH₃ | —CSNHCH₃ | Pre | 0 | | 0 | 1 | | 0 | 2 | 0 | 0 | 0 | | 0 | | | |
| CH₃ | —CONHCH₂CH=CH₂ | Post | 3 | 4 | 1 | 2 | 1 | 0 | | 4 | | 2 | 3 | 2 | | | 1 |
| | | Pre | | | | | | | | | | | | | | | |

I claim:

1. The method of combating undesired vegetation comprising applying to the locus of the undesired vegetation a herbicidally effective amount of N,N'-dimethyl-N'-(5-tert.butyl-6H-1,3,4-thiadiazin-2-yl)urea.

2. The method of combating undesired vegetation comprising applying to the locus of the undesired vegetation a herbicidally effective amount of N-methyl-N'-(5-tert.butyl-6H-1,3,4-thiadiazin-2-yl)urea.

3. The method of combating undesired vegetation comprising applying to the locus of the undesired vegetation a herbicidally effective amount of N-ethyl-N'-methyl-N-(5-tert.butyl-6H-1,3,4-thiadiazin-2-yl)urea.

4. The method of combating undesired vegetation comprising applying to the locus of the undesired vegetation a herbicidally effective amount of N-allyl-N'-(5-tert.butyl-6H-1,3,4-thiadiazin-2-yl)-N'-methylurea.

* * * * *